United States Patent
Kasahara

(10) Patent No.: US 9,497,389 B2
(45) Date of Patent: Nov. 15, 2016

(54) INFORMATION PROCESSING DEVICE, INFORMATION PROCESSING METHOD, AND PROGRAM FOR REDUCTION OF NOISE EFFECTS ON A REFERENCE POINT

(71) Applicant: SONY CORPORATION, Minato-ku (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 172 days.

(21) Appl. No.: 14/342,974

(22) PCT Filed: Oct. 3, 2012

(86) PCT No.: PCT/JP2012/006336
§ 371 (c)(1),
(2) Date: Mar. 5, 2014

(87) PCT Pub. No.: WO2013/069196
PCT Pub. Date: May 16, 2013

(65) Prior Publication Data
US 2014/0240552 A1   Aug. 28, 2014

(30) Foreign Application Priority Data

Nov. 11, 2011 (JP) .................................. 2011-248098

(51) Int. Cl.
| H04N 5/265 | (2006.01) |
| H04N 5/225 | (2006.01) |
| H04N 5/33 | (2006.01) |
| G06T 19/00 | (2011.01) |
| H04N 5/232 | (2006.01) |

(52) U.S. Cl.
CPC ............. *H04N 5/265* (2013.01); *G06T 19/006* (2013.01); *H04N 5/2256* (2013.01); *H04N 5/33* (2013.01); *H04N 5/23293* (2013.01)

(58) Field of Classification Search
CPC ................... H04N 7/183; H04N 5/225; H04N 5/2251; H04N 5/23206; H04N 5/23212; H04N 5/23245
USPC .................. 348/135, 164, E05.085, E05.09, 348/E13.023
See application file for complete search history.

(56) References Cited

U.S. PATENT DOCUMENTS

| 2002/0075286 A1* | 6/2002 | Yonezawa | ............ G02B 27/017 345/679 |
| 2003/0179308 A1* | 9/2003 | Zamorano | ................ A61B 5/00 348/333.12 |
| 2006/0221098 A1* | 10/2006 | Matsui | .................. G06T 7/0018 345/633 |
| 2010/0208057 A1* | 8/2010 | Meier | .................... G06T 7/0046 348/135 |

(Continued)

FOREIGN PATENT DOCUMENTS

| JP | 2003-256876 A | 9/2003 |
| JP | 2008-046687 A | 2/2008 |

(Continued)

*Primary Examiner* — Hung Lam
(74) *Attorney, Agent, or Firm* — Chip Law Group

(57) ABSTRACT

An apparatus including an image processor configured to receive a video, superimpose an object on the video at a distance from a reference point, and modify a location of the object based on a distance between the object and the reference point in a later frame.

19 Claims, 12 Drawing Sheets

(56) References Cited

U.S. PATENT DOCUMENTS

| | | | |
|---|---|---|---|
| 2011/0090343 A1* | 4/2011 | Alt | G06T 7/0044 |
| | | | 348/164 |
| 2011/0216961 A1* | 9/2011 | Ishige | G06K 9/00 |
| | | | 382/154 |
| 2013/0120224 A1* | 5/2013 | Cajigas | G09G 5/00 |
| | | | 345/8 |

FOREIGN PATENT DOCUMENTS

| | | |
|---|---|---|
| JP | 2009-025918 A | 2/2009 |
| JP | 2010-238096 A | 10/2010 |

* cited by examiner

STATE QUANTITY X: POSITION P, POSTURE W, MAGNITUDE Sc, OR
COMBINATION OF P, W, AND Sc

INFORMATION PROCESSING DEVICE, INFORMATION PROCESSING METHOD, AND PROGRAM FOR REDUCTION OF NOISE EFFECTS ON A REFERENCE POINT

TECHNICAL FIELD

The present disclosure relates to an information processing device, an information processing method, and a program encoded on a non-transitory computer readable medium.

BACKGROUND ART

In recent years, a technique known as Augmented Reality (AR) that overlaps real images with additional information and presents a user with the information has been attracting attention. The information presented to the user in the AR technique is referred to as an annotation, and is visualized in various forms of virtual objects such as text, an icon, and an animation. As an example of the AR technique, a technique of overlapping a real image with a virtual object image imitating a real object such as furniture, displaying the virtual image, and simplifying an attempt to arrange the object such as furniture is disclosed in Patent Literature 1.

The AR technique mentioned above, for example, carries out imaging on the real image and recognizes the object shown in the image using a device held by a user. The imaged image is overlapped with the virtual object associated with the recognized object and displayed.

CITATION LIST

Patent Literature

PTL 1: JP 2003-256876A

SUMMARY

Technical Problem

In this case, the virtual object is displayed on a coordinate space determined based on a position of the recognized object. The position of the recognized object includes noises due to various factors. When the noise is included in the position of the recognized object, a fluctuation occurs on the position at which the virtual object is displayed. The fluctuation causes the user displeasure. In this case, the farther the virtual object is displayed from a reference point, the more susceptible the virtual object is to the noise effect.

In view of this, the present disclosure proposes an information processing device, an information processing method, and a program encoded on a non-transitory computer readable medium that are novel and improved, which enable noise effects on a reference point to be reduced by properly displaying a virtual object in accordance with the distance from the reference point.

Solution to Problem

In one embodiment, the present invention includes an apparatus that includes an image processor configured to receive a video, superimpose an object on the video at a distance from a reference point, and modify a location of the object based on a distance between the object and the reference point in a later frame.

DESCRIPTION OF EMBODIMENTS

Figure 1:
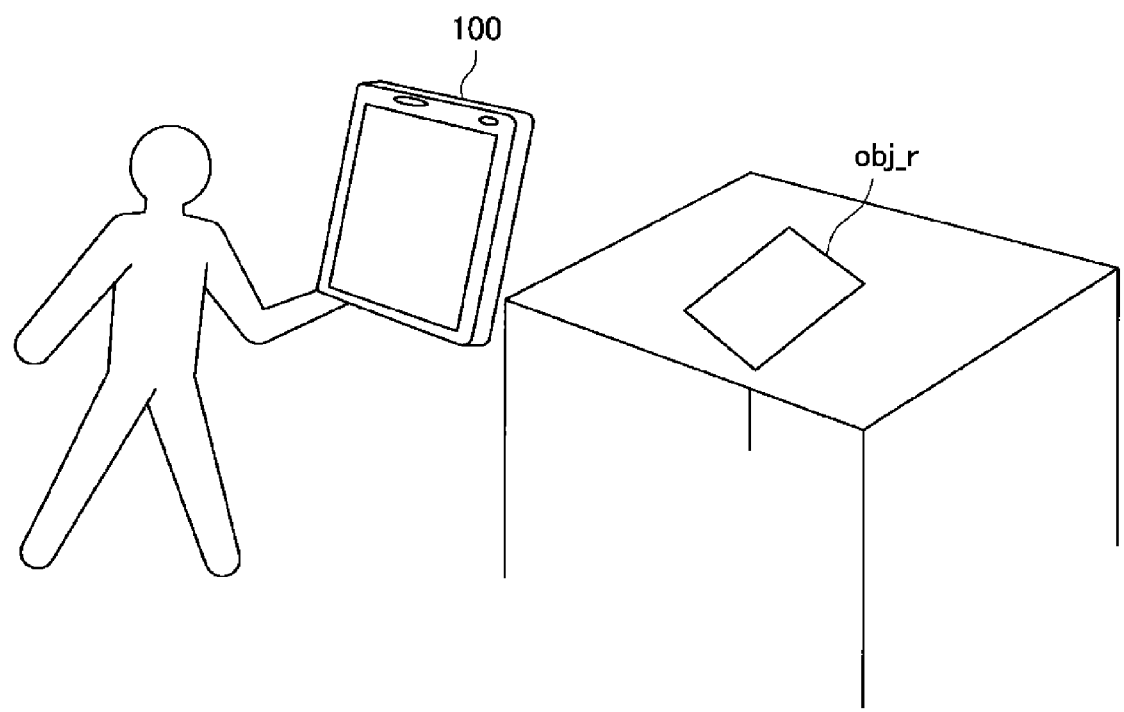
FIG. 1 is a diagram illustrating an outline of functions of an information processing device according to an embodiment of the present disclosure.

Hereinafter, preferred embodiments of the present disclosure will be described in detail with reference to the appended drawings. Note that, in this specification and the appended drawings, structural elements that have substantially the same functions and structures are denoted with the same reference numerals, and repeated explanation of these structural elements is omitted.

In addition, the description is made in the following order:
1. Outline
2. Example of hardware configuration
3. First embodiment (Example in which position is corrected)
   3-1. Functional configuration
   3-2. Operation 4. Second embodiment (Example of display in which visual effect is added)
   4-1. Functional configuration
   4-2. Operation
5. Third embodiment (Position correction+visual effect)

1. Outline

Figure 2:
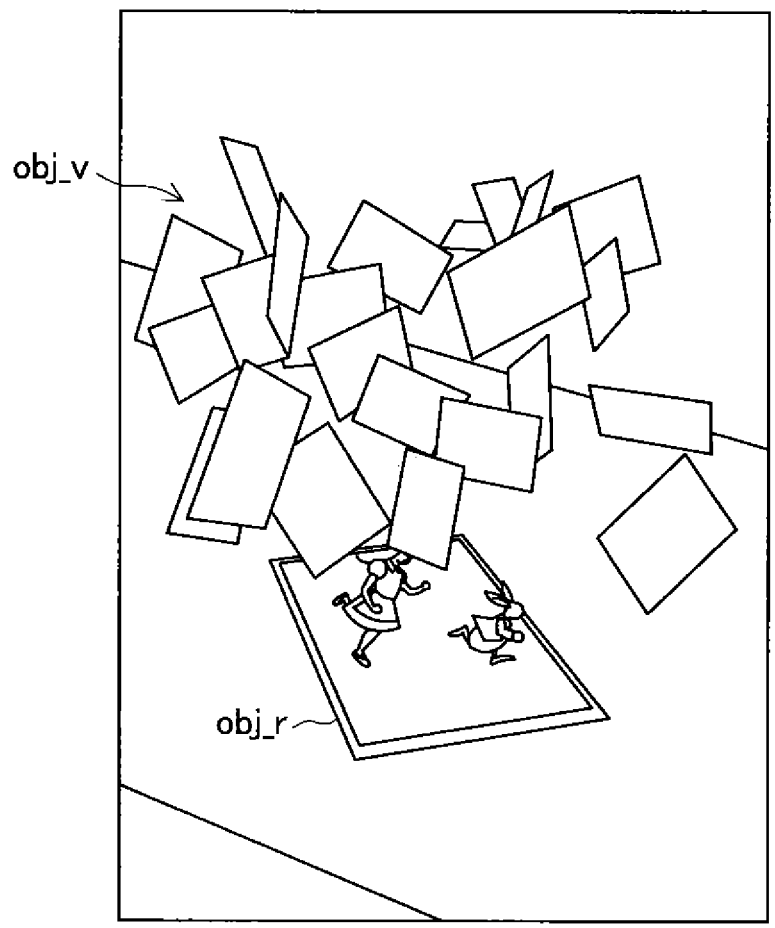
FIG. 2 is a diagram illustrating an example of a screen displayed by the information processing device according to the embodiment of the present disclosure.
Figure 3:
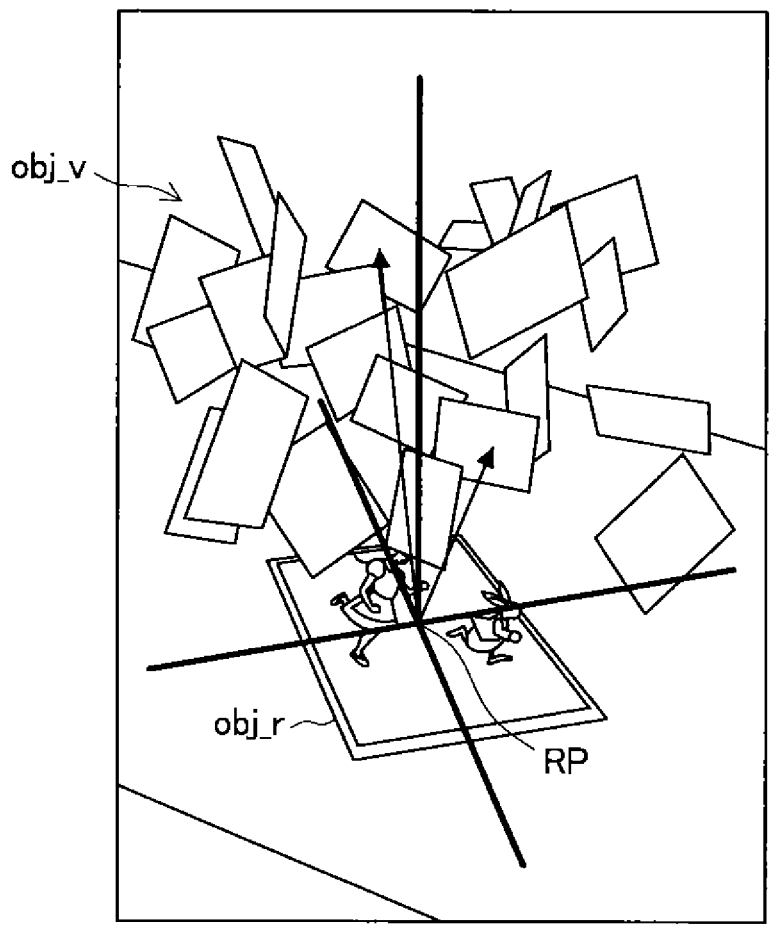
FIG. 3 is a diagram illustrating a method of displaying a screen displayed by the information processing device according to the embodiment of the present disclosure.
Figure 4:
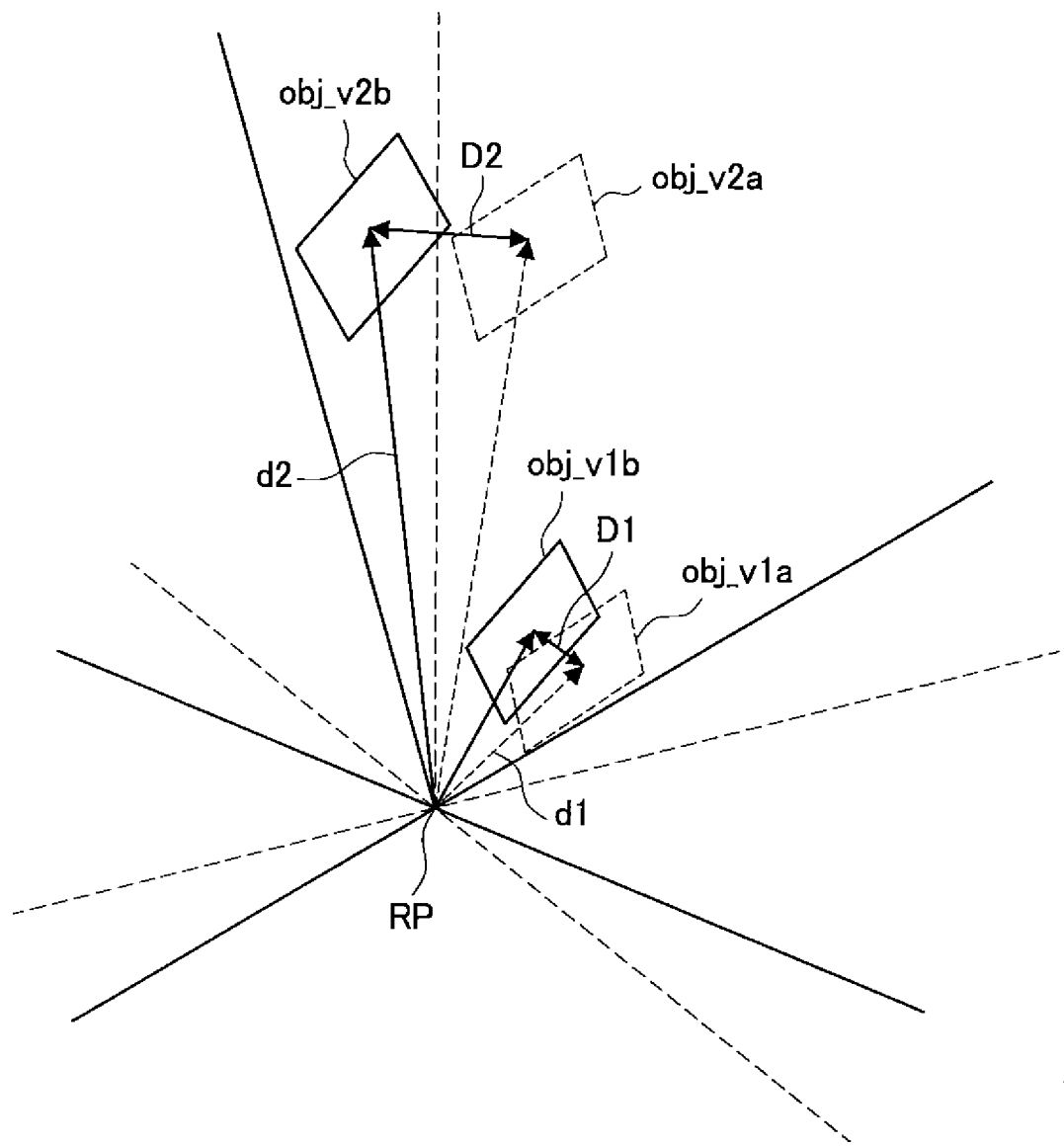
FIG. 4 is a diagram illustrating a fluctuation at a display position occurring on the information processing device according to the embodiment of the present disclosure.

First, an outline of an information processing device according to an embodiment of the present disclosure will be described with reference to FIGS. 1 to 4. FIG. 1 is a diagram illustrating an outline of functions of the information processing device in accordance with the embodiment of the present disclosure. FIG. 2 is a diagram illustrating an example of a screen displayed by the information processing device in accordance with the embodiment of the present disclosure. FIG. 3 is a diagram illustrating a method of displaying a screen displayed by the information processing device in accordance with the embodiment of the present disclosure. FIG. 4 is a diagram illustrating a fluctuation at a display position occurring on the information processing device in accordance with the embodiment of the present disclosure.

In addition, in the case of the "information processing device according to one embodiment" in the present disclosure, matters in common with a plurality of embodiments that will be described later are described.

An information processing device 100 is a device providing a user with an AR application. The information processing device 100 may be, for example, a terminal device such as a smartphone, a Personal Data Assistance (PDA), portable game equipment, and portable music reproduction equipment. Alternatively, the information processing device 100 may be an information processing device such as a Personal Computer (PC) or a workstation.

In the present disclosure, the user starts a specific AR application of the information processing device 100 and then, for example, holds up the information processing device 100 so that a real object obj_r that is an object disposed in a real space is displayed within a display screen of the information processing device 100 (FIG. 1). The virtual object obj_v is then displayed in a space near the imaged real object obj_r in the display screen of the information processing device 100 (FIG. 2). Here, the virtual object obj_v includes a plurality of cards.

In this case, the information processing device 100 recognizes the real object obj_r in the imaged image. The information processing device 100 then causes the virtual object obj_v to be displayed in a position on a coordinate space assumed based on the recognized real object obj_r (FIG. 3). Here, the coordinate space, for example, may use a reference point RP of the recognized object as an origin. The reference point RP of the object, for example, may be a centroid of the object. Alternatively, a direction of a coordinate axis may be determined based on the posture of the recognized real object obj_r.

Here, noises are included in the determined coordinate space due to various factors. For example, the coordinate space is determined by recognizing the position, the magnitude, and the posture of the reference point RP of the real object obj_r. When the noises are included at the time of recognizing the position, the magnitude, and the posture of the reference point RP, noise effects are also included in the position of the virtual object obj_v to be determined based on the position, the magnitude, and the posture.

For example, referring to FIG. 4, positions of two virtual objects obj_v (first virtual object obj_v1 and second virtual object obj_v2) on the coordinate space are illustrated. Here, a first virtual object obj_v1a and a second virtual object obj_v2a on the coordinate space when noises are not included and a first virtual object obj_v1b and a second virtual object obj_v2b on the coordinate space when noises are included are shown.

Here, for example, a case in which the noises are included in a rotational component of the real object obj_r is illustrated. In this case, a distance d1 between the first virtual object obj_v1 and the reference point RP is shorter than a distance d2 between the second virtual object obj_v2 and the reference point RP. In this case, a difference D2 of the display position due to the noise effect on the second virtual object obj_v2 is greater than a difference D1 of the display position due to the noise effect on the first virtual object obj_v1. The present disclosure proposes reducing the noise effect on the user by properly changing the display of the virtual object obj_v in accordance with the distance D. Examples of changing the display of the virtual object including an example of correcting the display position and an example of carrying out the display added with a visual effect will be described in detail below. In addition, an example of applying an after-image effect is given as an example of the visual effect for reducing the displeasure caused to the user by the fluctuation generated due to the noise.

2. Example of Hardware Configuration

Figure 5:
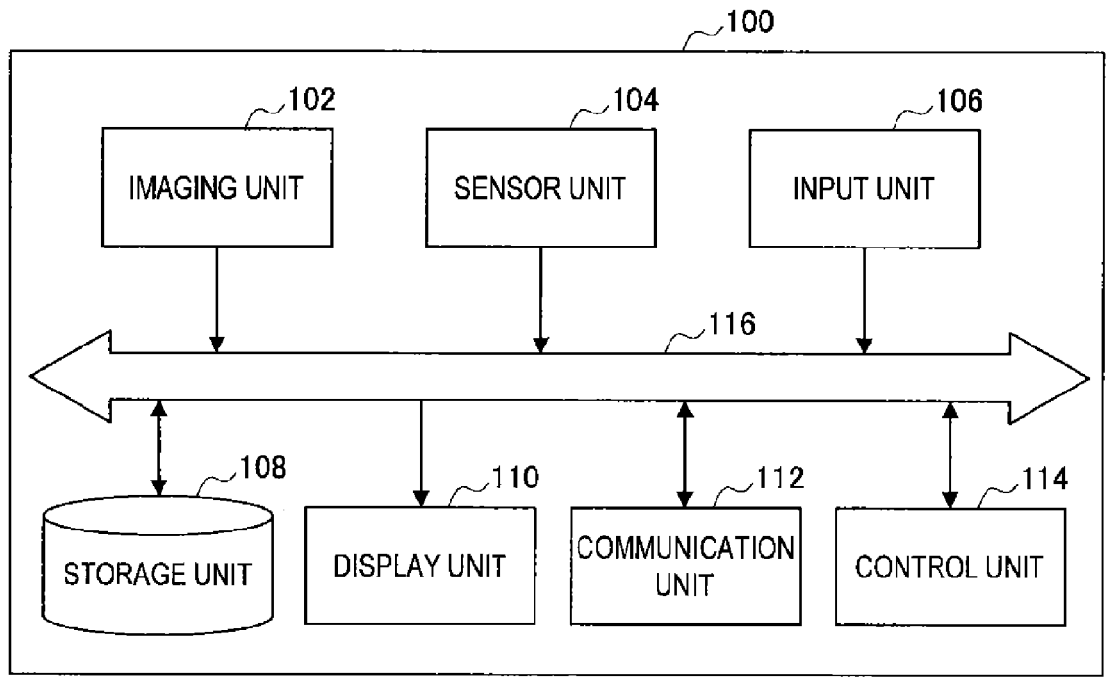
FIG. 5 is a block diagram illustrating an example of a hardware configuration of the information processing device according to the embodiment of the present disclosure.

Here, an example of the hardware configuration of the information processing device according to an embodiment of the present disclosure will be described with reference to FIG. 5. FIG. 5 is a block diagram illustrating an example of the hardware configuration of the information processing device in accordance with the embodiment of the present disclosure.

In addition, the hardware configuration is an example in which functions of the information processing device are realized in accordance with each of embodiments of the present disclosure that will be described later. The present disclosure is not limited to such examples, and some components described herein may be omitted. In addition, other components than the components described herein may be further included. In addition, components described herein may be replaced with other components having the same functions.

The information processing device 100 includes an imaging unit 102, a sensor unit 104, an input unit 106, a storage unit 108, a display unit 110, a communication unit 112, a control unit 114, and a bus 116.

(Imaging Unit 102)

The imaging unit 102 is a camera module imaging an image. The imaging unit 102 images a real space using an imaging element such as a Charge Coupled Device (CCD) or a Complementary Metal Oxide Semiconductor (CMOS), and generates an imaged image. The imaged image generated by the imaging unit 102 includes each frame of a video input.

(Sensor Unit 104)

The sensor unit 104 includes a motion sensor group measuring movements of the imaging unit 102. The motion sensor, for example, may be an acceleration sensor measuring an acceleration of the imaging unit 102, a gyro sensor measuring a tilt angle, or a geomagnetic sensor measuring a directed orientation of the imaging unit 102. In addition, the sensor unit 104 may include a Global Positioning System (GPS) sensor receiving a GPS signal and measuring latitude, longitude, and altitude of a device.

(Input Unit 106)

The input unit 106 is an input device used for the user to operate the information processing device 100 or input information to the information processing device 100. Typically, the input unit 106 includes a touch sensor detecting a touch on the screen of the display unit 110 by the user. Instead (or in addition), the input unit 106 may include a pointing device such as a mouse or a touch pad, a gesture recognition module recognizing the gesture of the user shown in the image, or a line of sight detection module detecting the line of sight direction of the user wearing a Head Mounted Display (HMD). Further, the input unit 106 may include various other input devices such as a keyboard, a keypad, a button, or a switch.

(Storage Unit 108)

The storage unit 108 includes a storage medium such as a semiconductor memory or a hard disk, and stores a program and data for processing by the information processing device 100. The data stored by the storage unit 108, for example, includes image data generated by the imaging unit 102 and sensor data generated by the sensor unit 104. In addition, the data stored by the storage unit 108, for example, includes model data used when the information processing device 100 recognizes an object, object data defining the virtual object obj_v, and so forth.

(Display Unit 110)

The display unit 110 is a display module including a Liquid Crystal Display (LCD), an Organic Light-Emitting Diode (OLED), a Cathode Ray Tube (CRT), or the like. The display unit 100, for example, displays an image imaged by the imaging unit 102 or an image of the AR application realized by the control unit 114 on a screen. The display unit 110 may be a screen of the information processing device 100 held by the user or may be a see-through type or a non-see-through type HMD that the user wears. In one embodiment, the sensor unit 104 is on an opposite surface of information processing device 100 from display unit 110.

(Communication Unit 112)

The communication unit 112 is a communication interface mediating the communication between the information processing device 100 and other devices. The communication unit 112 supports any wireless communication protocol or wired communication protocol, and establishes a communication connection with other devices.

(Control Unit 114)

The control unit 114 corresponds to a processor such as a Central Processing Unit (CPU) or a Digital Signal Processor (DSP). The control unit 114 executes programs stored in the storage unit 108 or other storage media to cause various functions of the information processing device 100 that will be described later to be carried out.

(Bus 116)

The bus 116 interconnects the imaging unit 102, the sensor unit 104, the input unit 106, the storage unit 108, the display unit 110, the communication unit 112, and the control unit 114 to each other.

The example of the hardware configuration of the information processing device 100 according to an embodiment of the present disclosure has been described. The information processing device 100 may realize functions of the present disclosure by causing the control unit 114 described above to execute the control program in which processing orders realizing the functions of the information processing device 100 according to each of the embodiments that will be described later are described. In addition, the computer program for realizing each function of the information processing device 100 according to each of the embodiments that will be described later may be created and installed on a personal computer or the like. In addition, a computer readable recording medium on which the computer program is stored may also be provided. The recording medium, for example, includes a magnetic disk, an optical disc, a flash memory, and so forth. In addition, the computer program described above may also be distributed, for example, via a network without using the recording medium.

3. First Embodiment

Example in which Position is Corrected

First, the information processing device of the first embodiment of the present disclosure that corrects a position in accordance with a distance between the reference point and the virtual object obj_v will be described.

(3-1. Functional Configuration)

Figure 6:
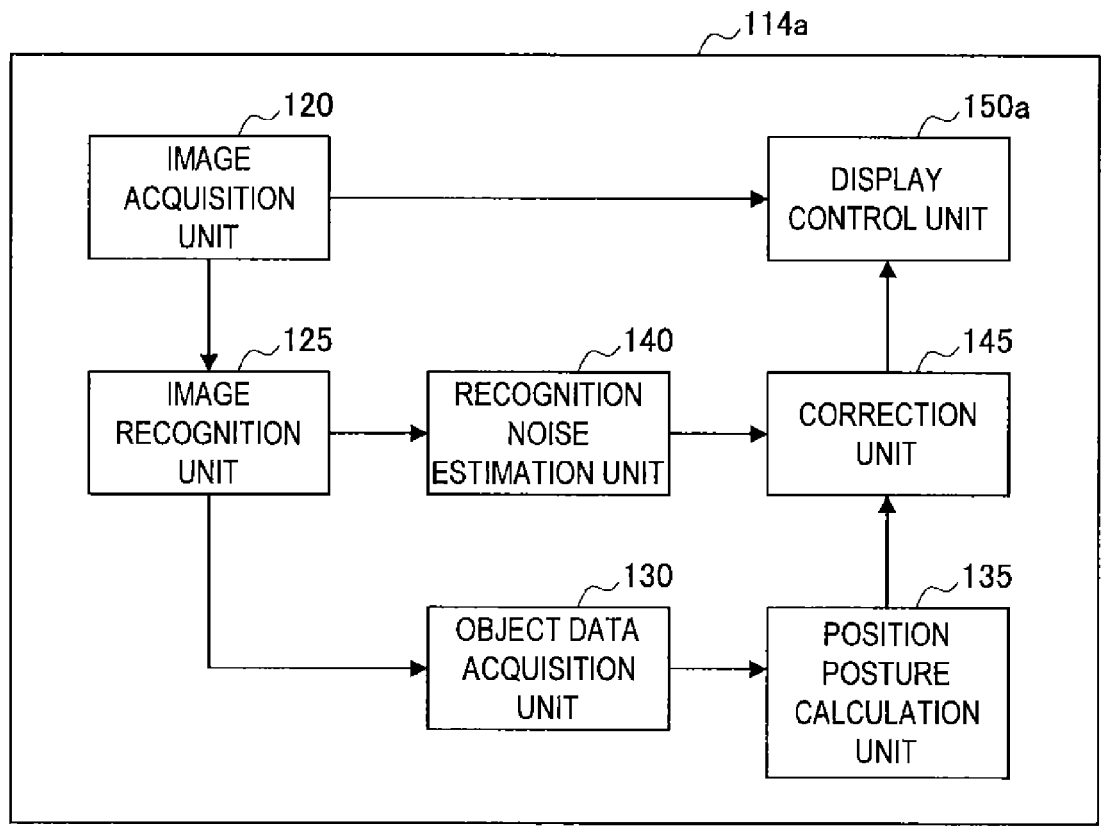
FIG. 6 is a block diagram illustrating a functional configuration of an information processing device according to a first embodiment of the present disclosure.
Figure 7:
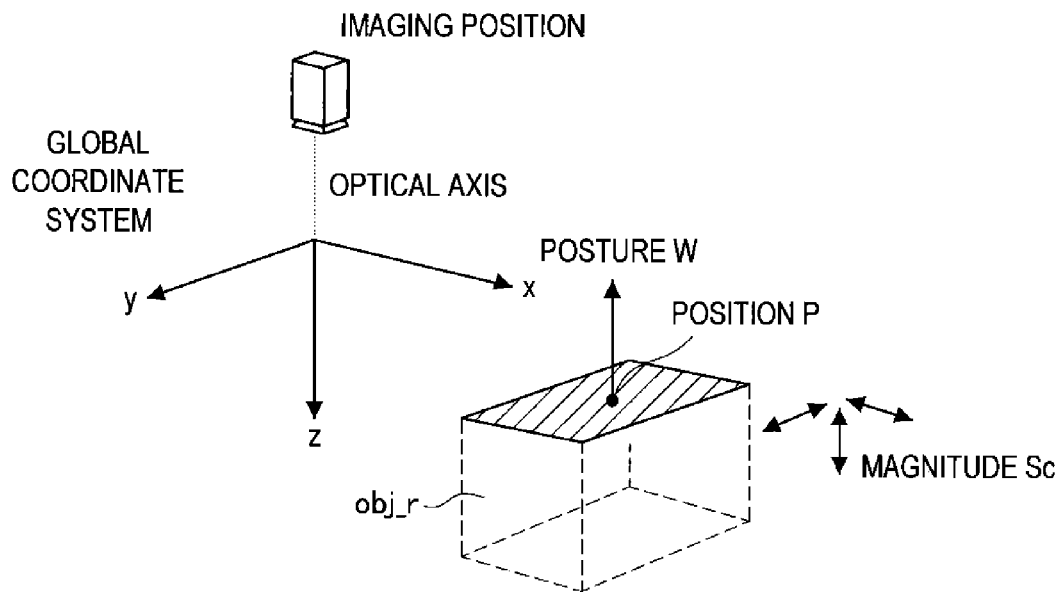
FIG. 7 is a diagram illustrating a state of an object recognized with indexes by the information processing device according to the first embodiment of the present disclosure.
Figure 8:
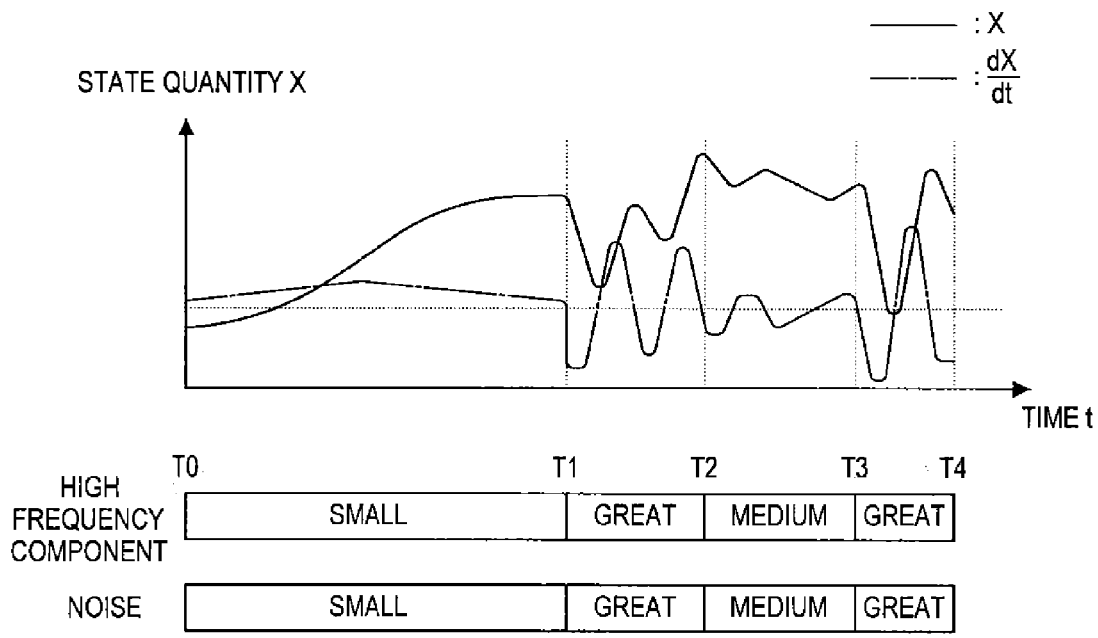
FIG. 8 is a diagram illustrating noise estimation of the information processing device according to the first embodiment of the present disclosure.
Figure 9:
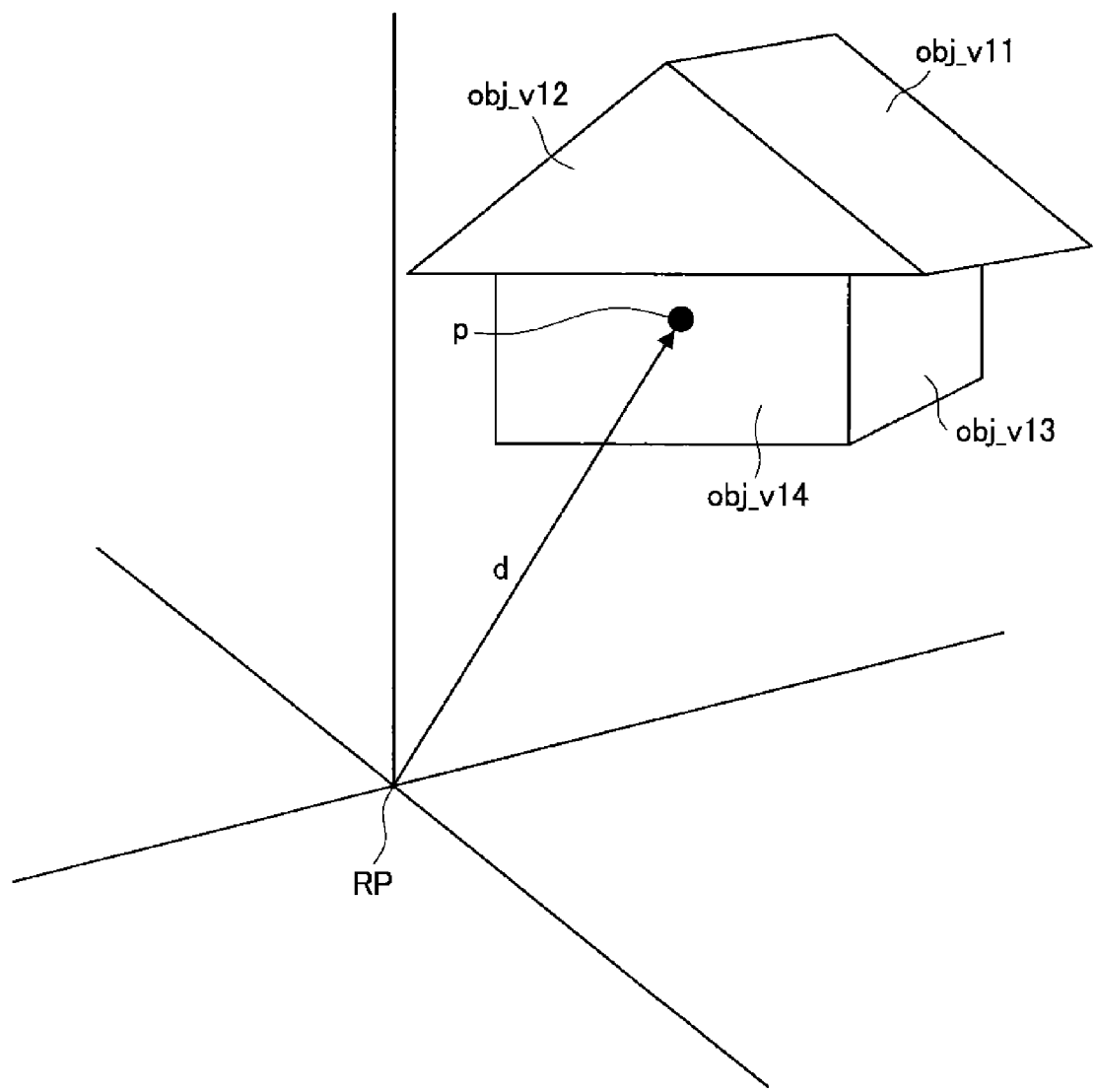
FIG. 9 is a diagram illustrating an example of using a representative point of a plurality of virtual objects in the information processing device according to the first embodiment of the present disclosure.

Here, an example of the functional configuration realized by a control unit 114a of the information processing device 100 according to the first embodiment of the present disclosure will be described with reference to FIGS. 6 to 9. FIG. 6 is a block diagram illustrating a functional configuration of the information processing device according to the first embodiment of the present disclosure. FIG. 7 is a diagram illustrating a state of an object recognized with indexes by the information processing device according to the first embodiment of the present disclosure. FIG. 8 is a diagram illustrating noise estimation of the information processing device in accordance with the first embodiment of the present disclosure. FIG. 9 is a diagram illustrating an example of using a representative point of a plurality of virtual objects obj_v in the information processing device in accordance with the first embodiment of the present disclosure.

Referring to FIG. 6, the control unit 114a generally includes an image acquisition unit 120, an image recognition unit 125, an object data acquisition unit 130, a position posture calculation unit 135, a recognition noise estimation unit 140, a correction unit 145, and a display control unit 150a.

(Image Acquisition Unit 120)

The image acquisition unit 120 acquires an input image in which the real space imaged using the imaging unit 102 (or another imaging device) is shown. The input image is an image in which a place or an object within the real space at which the virtual object obj_v is disposed is shown. The image acquisition unit 120 supplies the acquired input image to the image recognition unit 125 and the display control unit 150a. For example, when the imaging unit 102 (or another imaging device) continuously images the real space, the image acquisition unit 120 may continuously acquire the input image.

(Image Recognition Unit 125)

The image recognition unit 125 may recognize the object shown in the input image supplied from the image acquisition unit 120. The image recognition unit 125, for example, may use the model data stored in the storage unit 108 or the model data stored in an external device connected via the communication unit 112 to carry out object recognition. The model data is information associated with a shape or an appearance of the object that is a target to be recognized by the information processing device 100. In the present embodiment, the recognition target of the information processing device 100, for example, may be any object present in the real space such as the real object obj_r illustrated in FIG. 1. The model data may include data defining a shape of each object, image data such as a predetermined symbol mark or a text label attached to each object, or data of a feature quantity set extracted from a known image in each object.

The image recognition unit 125 recognizes what object is shown in the input image supplied from the image acquisition unit 120 and a state of the object shown in the input image. The state of the object recognized by the image acquisition unit 125 includes at least one of the position and the posture of the object. In the present embodiment, the image recognition unit 125 recognizes the position, the posture, and the size of the object within the image. The image recognition unit 125, for example, may collate the feature point set extracted from the input image with the shape of the object that may be defined by the model data. In addition, the image recognition unit 125 may collate the image data such as the symbol mark or the text label that may be defined by the model data with the input image. In addition, the image recognition unit 125 may collate the feature quantity of the known image of the object that may be defined by the model data with the feature quantity extracted from the input image. In any case, the image recognition unit 125 may recognize that the object indicating a collation score better than a predetermined threshold is shown in the input image using the position, the posture, and the magnitude corresponding to the collation score. Thus, the image recognition unit 125 recognizes the object in each frame, and tracks the object from frame to frame.

FIG. 7 is an explanation diagram for explaining a state quantity of the object recognized by the image recognition unit 125 according to the first embodiment of the present disclosure. Referring to FIG. 7, a global coordinate system formed by an x axis and a y axis on a plane orthogonal to an optical axis direction of the imaging device that has imaged the input image and a z axis along the optical axis direction is illustrated. The position P of the real object obj_r recognized by the image recognition unit 125 is given as a position coordinate of the reference point of the object in the global coordinate system. In addition, the posture W of the real object obj_r is given as a rotational angle around each axis. In addition, the magnitude Sc of the real object obj_r is given as a magnification toward each axis direction. In addition, for simple and clear description in the present disclosure, the position P, the posture W, and the magnitude Sc of each real object obj_r are described as separate variables (state quantities). However, the position P, the posture W, and the magnitude Sc of each real object obj_r may be comprehensively represented by one homogeneous transformation matrix of 4 rows*4 columns indicating transformation between the global coordinate system and the model coordinate system of each real object obj_r. In this case, each state quantity (i.e., each of the position P, the posture W, and the magnitude Sc) is extracted from the homogeneous transformation matrix as necessary and is used. In addition, the global coordinate system may be a coordinate system representing a relative coordinate using the position of the imaging device as an origin. Alternatively, the global coordinate system may be a coordinate system representing an absolute coordinate defined and fixed within the real space. The image recognition unit 125 may output an identifier of each real object obj_r shown in the input image, the position P, the posture W, and the magnitude Sc.

(Object Data Acquisition Unit 130)

The object data acquisition unit 130 has a function of acquiring data regarding the virtual object obj_v overlapping the input image by the display control unit 150. The data acquired by the object data acquisition unit 130 includes object data defining the virtual object obj_v. The object data, for example, may be data defining a kind of the virtual object obj_v, an identifier of the associated object, position information on the virtual object obj_v on a virtual coordinate space (hereinafter referred to as a virtual space), and contents of information content. The object data acquisition unit 130 may acquire the object data extracted based on the identifier of the real object obj_r recognized by the image recognition unit 125. The object data acquisition unit 130 may supply the acquired information to the position posture calculation unit 135.

(Position Posture Calculation Unit 135)

The position posture calculation unit 135 may calculate the position and the posture of the virtual object obj_v based on the data regarding the virtual object obj_v supplied from the object data acquisition unit 130 and the input image. In addition, the reference point RP of the real object obj_r used herein, for example, may be a centroid of the real object obj_r. In addition, the reference point RP may be a point that is obtained by analyzing the input image and has a small position variation. The position posture calculation unit 135, for example, may associate the virtual space with the real space by defining an origin position and coordinate axis directions of the virtual space based on the position and the posture of the real object obj_r recognized from the input image. In addition, the position posture calculation unit 135 may act as a distance calculation unit calculating a distance between the real object obj_r and the virtual object obj_v. For example, as described above, the virtual space in which arrangement of the virtual object is defined and the real space are associated with each other. However, when the reference point RP and the origin position of the virtual space match, the position posture calculation unit 135 may calculate the distance based on the position information on the virtual object on the virtual space. In addition, when the reference point RP and the origin position of the virtual space do not match, the position posture calculation unit 135 may calculate the distance based on the position information on the virtual object from the origin position of the virtual space and a position relation between the origin and the reference point RP.

(Recognition Noise Estimation Unit 140)

The recognition noise estimation unit 140 has a function of estimating the noise included in the recognition result from the image recognition unit 125. The recognition noise estimation unit 140, for example, may estimate whether the noise is included in the recognition result, and in what component the noise is included among information indicating states of the object. For example, the recognition noise estimation unit 140 may estimate whether the noise is included or estimate the magnitude of the noise by analyzing a time course of values of the state quantity X of the recognized real object obj_r. Here, the state quantity X may be the position P, the posture W, the magnitude Sc, or a combination of P, W, and Sc.

An example of the change in state quantity X is illustrated in FIG. 8. The horizontal axis of FIG. 8 is a time t, and the vertical axis is a state quantity X and a first derivative of the state quantity (dX/dt). In the example of FIG. 8, the state quantity X changes gently in a period from the time T0 to the time T1. In this case, for example, when a frequency component of the state quantity X is extracted by the Fourier transformation, a high frequency component of the state quantity X becomes small. In addition, an absolute value of the first derivative of the state quantity X does not exceed a predetermined level (a level corresponding to a realistic limit in which an object moves relatively with respect to the imaging device). The same also applies to a second derivative of the state quantity X. In addition, due to the fact that the change in state quantity X is gentle, a current value of the state quantity X is not greatly different with respect to a history of past m samples of the state quantity X. The history of the state quantity X may be a simple average value of the past m samples, or may be a weighted average value of the past m samples (the weight of the closer sample may be set to be greater).

On the other hand, the state quantity X changes sharply in a period from the time T1 to the time T2. In this case, when a frequency component of the state quantity X is extracted, a high frequency component of the state quantity X becomes greater. In addition, the first derivative of the state quantity X oscillates around zero. An absolute value of the first derivative exceeds the predetermined level mentioned above. In addition, the current value of the state quantity X may change greatly with respect to the history of the past m samples of the state quantity X.

Accordingly, the recognition noise estimation unit 140 may compare the magnitude of the high frequency component of the state quantity of the object, the absolute value (or an integrated value of the absolute values) of the first derivative (or second derivative) of the state quantity, or the current value of the state quantity with the history of the state quantity to evaluate the time variation of the state quantity. The recognition noise estimation unit 140 may then estimate that the stability of recognition is low and the noise is great as the evaluated time variation is sharper. In the example illustrated in FIG. 8, the noise in the period T0 to T1 is estimated to be "small," the noise in the period T1 to T2 is estimated to be "great," the noise in the period T2 to T3 is estimated to be "medium," and the noise in the period T3 to T4 is estimated to be "great."

In addition, the recognition noise estimation unit 140 may estimate in which component among indexes indicating states of the recognized object the noise is included for each kind of the state quantity X. As shown in FIG. 8, the recognition noise estimation unit 140 compares the magnitude of the high frequency component of the state quantity X, the absolute value (or an integrated value of the absolute values) of the first derivative (or the second derivative) of the state quantity, or the history of the state quantity with the current value of the state quantity to evaluate the time variation of the state quantity. For example, when the recognition noise estimation unit 140 carries out the evaluation using the posture W as the state quantity X and evaluates that the noise is great, the recognition noise estimation unit 140 may estimate that the noise is included in the rotational component of the real object obj_r.

(Correction Unit 145)

The correction unit 145 may correct the position or the posture of the virtual object obj_v calculated based on the object data of the virtual object obj_v and the recognized real object obj_r. The correction unit 145 may correct the position or the posture of the virtual object obj_v based on the distance between the real object obj_r and the virtual object obj_v. The correction unit 145 may correct the position or the posture such that an update rate of following the real object obj_r becomes slower to the extent that the virtual object obj_v is far from the reference point. The correction unit 145, for example, may correct only the component estimated to include the noise based on the estimation result from the recognition noise estimation unit 140. Alternatively, the correction unit 145 may correct only the rotational component.

The virtual object obj_v is associated with the position on the real space so as to follow the position or the posture of the real object obj_r. The display control unit 150 then overlaps the virtual object obj_v with the input image such that the virtual object obj_v is present in the associated position, and causes the virtual object to be displayed. Here, the position of the virtual object obj_v thus indicates the position associated on the real space.

In addition, when a plurality of virtual objects obj_v hold different phase states as shown in FIG. 9, the plurality of virtual objects obj_v may be treated as a group. The correction unit 145 may then determine a representative point of the plurality of virtual objects obj_v and calculate a distance between the representative point and the reference point. The plurality of virtual objects obj_v shown in FIG. 9 may form one coherent display state in which the plurality of virtual objects obj_v are collected. For example, the virtual object obj_v11, the virtual object obj_v12, the virtual object obj_v13, and the virtual object obj_v14 hold relative positions to each other to form a coherent shape. In this case, since the relative positions of the plurality of virtual objects obj_v are broken when displays of the respective virtual objects obj_v are changed, it is preferable to treat the plurality of virtual objects obj_v as a group and to similarly change the displays with respect to the plurality of virtual objects obj_v.

An example of the correction method includes a method of carrying out filtering according to the distance d of the recognized real object obj_r from the reference point. For example, when the position or posture of the portrayal element at the next time t+1 determined by the recognized matrix and model data is M'(t+1) and the position or posture of the portrayal element at the time t is M(t), the corrected position M(t+1) of the portrayal element at the time t+1 is represented as in equation 1 below. In this case, a indicates a coefficient according to the distance d.

$$M(t+1) = a*M'(t+1) + (1.0 - a)*M(t) \quad \text{(Math. 1)}$$

The coefficient a approaches zero when d increases, that is, when the portrayal element is farther from the reference point. In addition, the coefficient a approaches 1 when d is smaller.

In addition, as in the example of FIG. 9 described above, when the plurality of virtual objects obj_v are treated as a group, it is preferable to use common filter coefficients with respect to the plurality of virtual objects obj_v based on the distance between the representative point and the reference point. With this configuration, it is possible to keep relative positions of the plurality of virtual objects obj_v.

(Display Control Unit 150*a*)

The display control unit 150*a* has a function of controlling display of the display device. The display control unit 150*a* may overlap the input image with the virtual object obj_v and cause the virtual object to be displayed. In this case, the display control unit 150*a* may cause the virtual object obj_v to be displayed so as to make the virtual object obj_v follow at least one of the position and the posture of the real object obj_r. The display control unit 150*a* may then change the display of the virtual object obj_v based on the distance between the virtual object obj_v and the reference point. The display control unit 150*a* may change the display of the virtual object obj_v by causing the virtual object obj_v to be displayed based on information on the position corrected by the correction unit 145.

(3-2. Operation)

Figure 10:
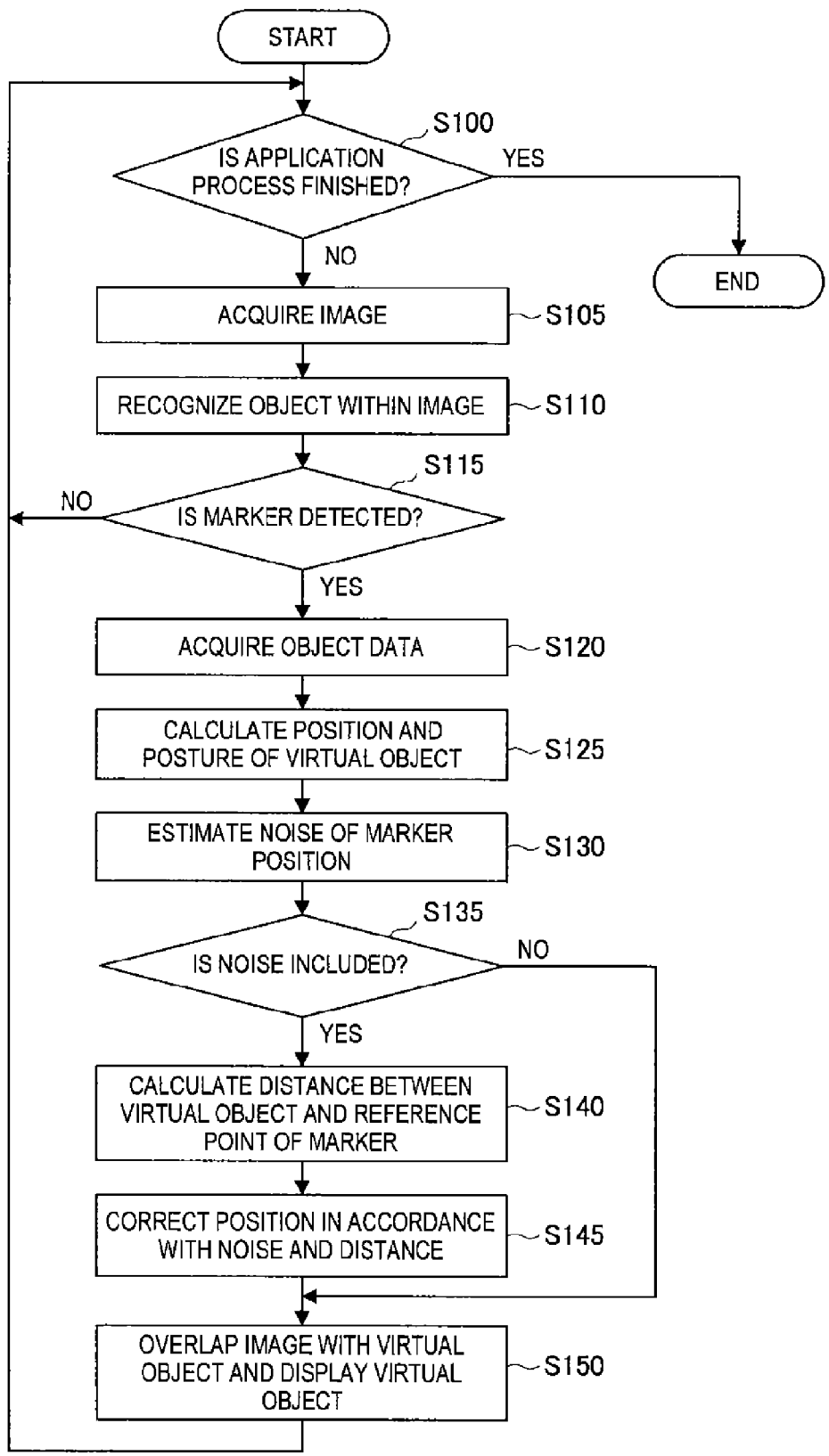
FIG. 10 is a flowchart illustrating an example operation of the information processing device according to the first embodiment of the present disclosure.

Next, an example of operations of the information processing device according to the first embodiment of the present disclosure will be described with reference to FIG. 10. FIG. 10 is a flowchart illustrating an example operation of the information processing device according to the first embodiment of the present disclosure.

The information processing device 100 determines whether the AR application process is finished (S100). When it is determined that the AR application process is finished in step S100, an operation of the AR application is finished. On the other hand, when it is determined that the AR application process is not finished in step S100, the image acquisition unit 120 acquires an image (S105). The image recognition unit 125 then recognizes the real object obj_r within the image acquired by the image acquisition unit 120 (S110). Here, the image used for the image recognition unit 125 to recognize the real object obj_r may be the image itself imaged by the imaging device or may be an image obtained after some process is carried out on the imaged image. The image recognition unit 125 may recognize the position or the posture of the real object obj_r.

Next, the image recognition unit 125 determines whether a marker (real object obj_r associated with the virtual object obj_v) is detected by the recognition (S115). When it is determined that the marker is detected in step S115, the object data acquisition unit 130 acquires object data associated with the marker (S120). In one embodiment, the marker is a cybercode, a bar code, or a Quick Response (QR) code.

Next, the position posture calculation unit 145 calculates the position or the posture of the virtual object obj_v (S125). The recognition noise estimation unit 140 then estimates the noise included in the marker position (S130). In this case, the recognition noise estimation unit 140 may estimate the property of the noise in the marker position.

The recognition noise estimation unit 140 determines whether the noise is included in the marker position (S135). When it is determined that the noise is included in step S135, the correction unit 145 calculates a distance between the virtual object obj_v and the reference point of the marker (S140). The correction unit 145 then corrects the position or the posture of the virtual object obj_v in accordance with the noise and the distance (S145). The display control unit 150a then overlaps the virtual object obj_v with an image and causes the virtual object to be displayed (S150). In this case, when correction is carried out by the correction unit 145, the display control unit 150a may overlap the image with the virtual object obj_v using the corrected position and posture.

4. Example of Display to which Visual Effect is Added

Next, an information processing device according to a second embodiment of the present disclosure that carries out visual effects in accordance with a distance between the reference point and the virtual object obj_v will be described.

(4-1. Functional Configuration)

Figure 11:
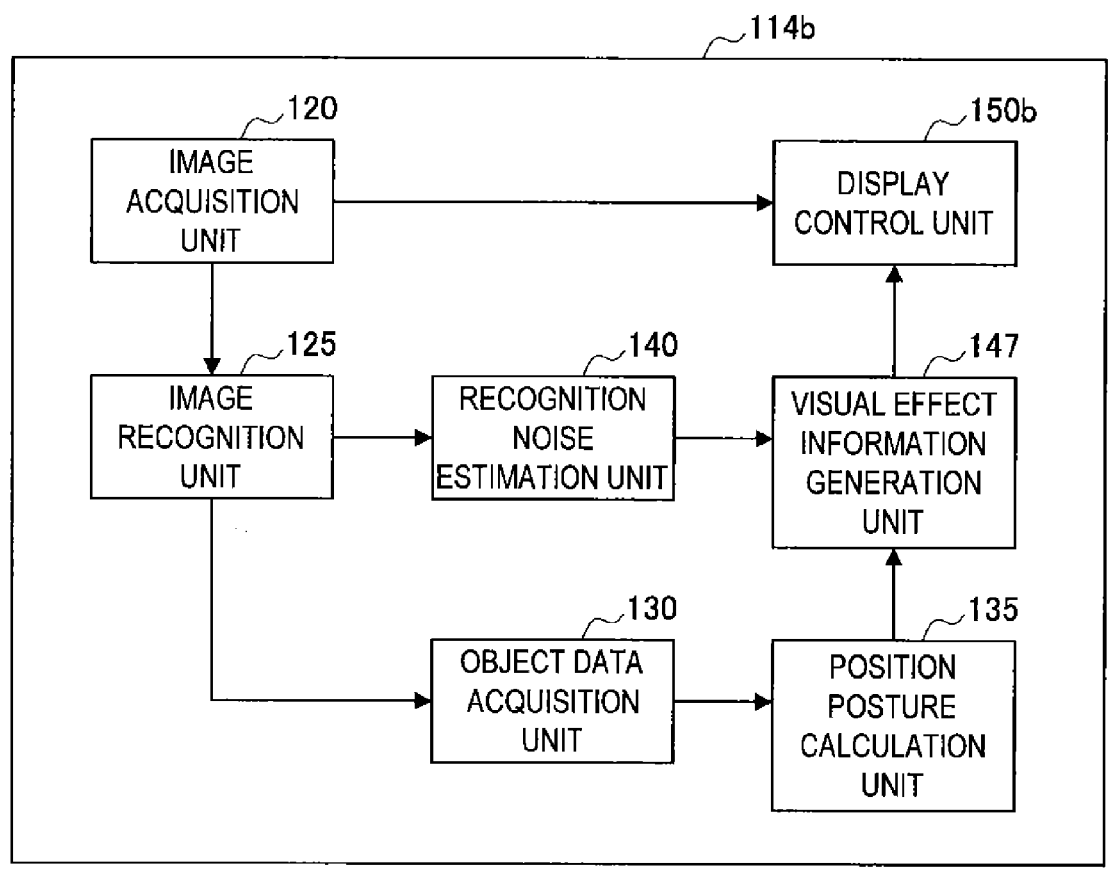
FIG. 11 is a block diagram illustrating a functional configuration of an information processing device according to a second embodiment of the present disclosure.
Figure 12:
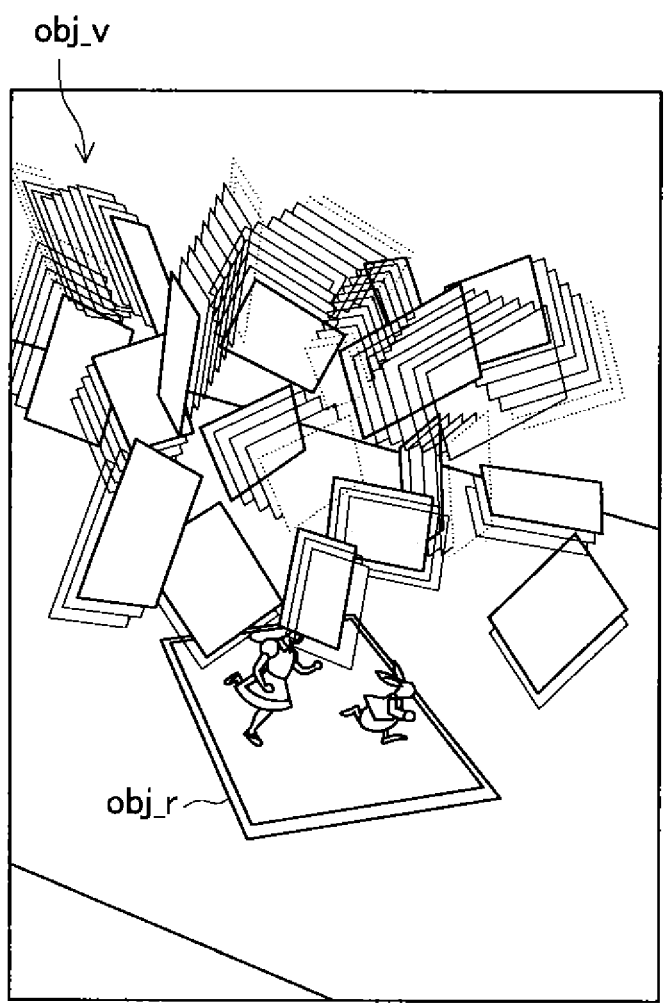
FIG. 12 is a diagram illustrating visual effects realized by the information processing device according to the second embodiment of the present disclosure.

Here, an example of the functional configuration realized by the control unit 114b of the information processing unit 100 according to a second embodiment of the present disclosure will be described with reference to FIGS. 11 and 12. FIG. 11 is a block diagram illustrating the functional configuration of the information processing unit according to the second embodiment of the present disclosure. FIG. 12 is a diagram illustrating visual effects realized by the information processing unit 100 according to a second embodiment of the present disclosure.

Referring to FIG. 11, the control unit 114b generally includes an image acquisition unit 120, an image recognition unit 125, an object data acquisition unit 130, a position posture calculation unit 135, a recognition noise estimation unit 140, a visual effect information generation unit 147, and a display control unit 150b.

(Visual Effect Information Generation Unit 147)

The visual effect information generation unit 147 has a function of generating visual effect information in accordance with the distance between the reference point RP of the real object obj_r and the virtual object obj_v. For example, the visual effect may be a motion blur effect representing the blurring of an object due to the motion. The motion blur effect, for example, may be represented by cascading after-images of the virtual object obj_v. The visual effect information generation unit 147, for example, may generate the visual effect information for adding the visual effect by which the after-image of the virtual object obj_v is displayed. The visual effect information generation unit 147 may generate the visual effect information by which more after-images are displayed as the distance increases.

In addition, as in the example of FIG. 9 described above, when the plurality of virtual objects obj_v are treated as a group, the visual effect information generation unit 147 may generate the common visual effect information with respect to the plurality of virtual objects obj_v based on the distance between the representative point and the reference point. With the configuration as described above, relative positions of the plurality of virtual objects obj_v are kept.

(Display Control Unit 150b)

The display control unit 150b has a function of controlling display of the display device. The display control unit 150b may overlap the input image with the virtual object obj_v and cause the virtual object to be displayed. In this case, the display control unit 150b may cause the virtual object obj_v to be displayed so as to make the virtual object obj_v follow at least one of the position and the posture of the real object obj_r. The display control unit 150b may then change the display of the virtual object obj_v based on the distance between the virtual object obj_v and the reference point. The display control unit 150b may change the display of the virtual object obj_v by causing the virtual object obj_v to be displayed in accordance with the visual effect information generated by the visual effect information generation unit 147. A case of display in which the visual effect information is information indicating the degree of the after-images of the virtual object obj_v is illustrated in FIG. 12. When the visual effect information is generated based on the distance between the virtual object obj_v and the reference point RP, more after-images are displayed when the virtual object obj_v is farther from the reference point of the real object obj_r.

(4-2. Operation)

Figure 13:
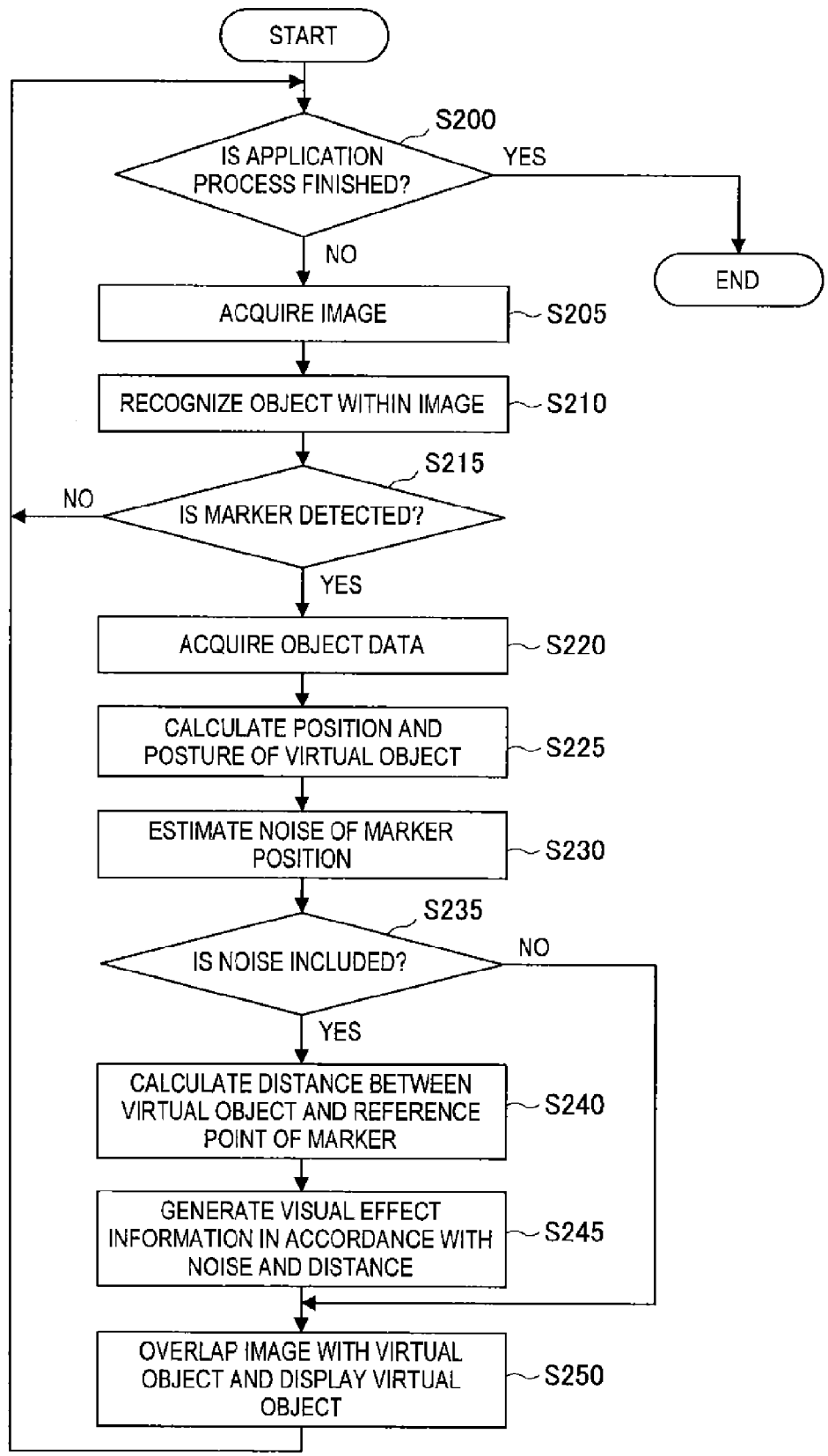
FIG. 13 is a flowchart illustrating an example operation of the information processing device according to the second embodiment of the present disclosure.

Next, an example operation of the information processing device according to the second embodiment of the present disclosure will be described with reference to FIG. 13. FIG. 13 is a flowchart illustrating the example operation of the information processing device according to the second embodiment.

The information processing device 100 determines whether the AR application process is finished (S200). When it is determined that the AR application process is finished in step S100, the AR application operation is finished. On the other hand, when it is determined that the AR application process is not finished in step S100, the image acquisition unit 120 acquires an image (S205). The image recognition unit 125 recognizes the real object obj_r within the image acquired by the image acquisition unit 120 (S210). Here, the image used for the image recognition unit 125 to recognize the real object obj_r may be an image imaged by the imaging device, or may be an image obtained after some process is carried out on the imaged image. The image recognition unit 125 may recognize the position or the posture of the real object obj_r.

Next, the image recognition unit 125 determines whether a marker (real object obj_r associated with the virtual object obj_v) is detected by the recognition (S215). When it is determined that the marker is detected in step S215, the object data acquisition unit 130 acquires object data associated with the marker (S220).

Next, the position posture calculation unit 145 calculates the position or the posture of the virtual object obj_v (S225). The recognition noise estimation unit 140 then estimates the noise included in the marker position (S230). In this case, the recognition noise estimation unit 140 may estimate the property of the noise in the marker position.

The recognition noise estimation unit 140 then determines whether the noise is included in the marker position (S235). When it is determined that the noise is included in step S235, the correction unit 145 calculates the distance between the virtual object obj_v and the reference point of the marker (S240). The visual effect information generation unit 147 generates the visual effect information of the virtual object obj_v in accordance with the noise and the distance (S245). The display control unit 150b then overlaps an image with the virtual object obj_v and causes the virtual object to be displayed (S250). In this case, when the visual effect information is generated by the visual effect information generation unit 147, the display control unit 150b may overlap the image with the virtual object obj_v in accordance with the generated visual effect information.

5. Third Embodiment

Position Correction+Visual Effect

Next, the information processing device according to a third embodiment of the present disclosure that has at least one of a function of correcting the position of the virtual object obj_v in accordance with the distance between the reference point and the virtual object obj_v and a function of carrying out the visual effect will be described.

Figure 14:
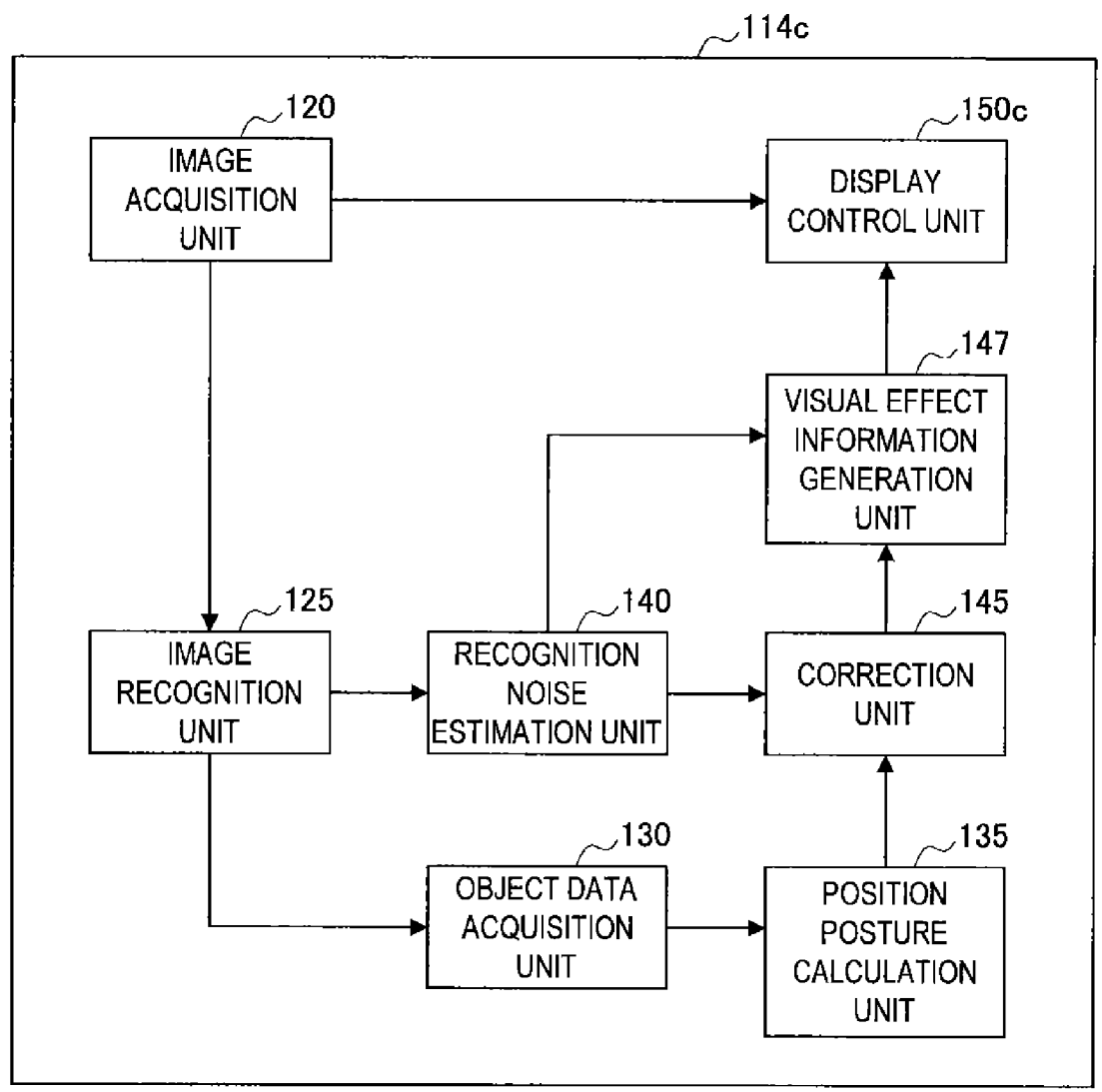
FIG. 14 is a diagram illustrating a functional configuration of an information processing device according to a third embodiment of the present disclosure.

First, an example of the functional configuration realized by a control unit 114c of the information processing device 100 according to the third embodiment of the present disclosure will be described with reference to FIG. 14. FIG. 14 is a block diagram illustrating the functional configuration of the information processing device according to the third embodiment of the present disclosure.

Referring to FIG. 14, the control unit 114c generally includes an image acquisition unit 120, an image recognition unit 125, an object data acquisition unit 130, a position posture calculation unit 135, a recognition noise estimation unit 140, a correction unit 145, a visual effect information generation unit 147, and a display control unit 150c.

(Display Control Unit 150c)

When the position of the virtual object obj_v is corrected by the correction unit 145, the display control unit 150c may cause the virtual object obj_v to be displayed in the corrected position. In addition, when the visual effect information is generated by the visual effect information generation unit 147, the display control unit 150c may cause the virtual object obj_v to be displayed in accordance with the generated visual effect information. Accordingly, in this case, following the real object obj_r is slower when the virtual object obj_v is farther from the reference point RP, and more after-images are displayed when the virtual object obj_v is farther from the reference point RP.

It should be understood by those skilled in the art that various modifications, combinations, sub-combinations and alterations may occur depending on design requirements and other factors insofar as they are within the scope of the appended claims or the equivalents thereof.

For example, although the image used for recognition of the image recognition unit and the image displayed by the display control unit are the same as each other in the embodiments described above, the present disclosure is not limited to such examples. For example, the image recognition unit may use an image acquired by the image acquisition unit and subjected to a predetermined process, for example, a process of reducing the image size.

In addition, it has been mainly described that the image is displayed on the screen of the display unit 110 of the information processing device 100 in the embodiments described above. However, the device having a function realized by the control unit 114 of the information processing device 100 in the embodiments described above and a device having a display unit in the embodiments described above may be devices separate from each other. In this case, an image overlapped with the virtual object obj_v is transmitted to the device having the display unit and then displayed on the display unit.

In addition, it has been described that functions of the information processing device 100 are installed on one device in the embodiments described above. However, the present disclosure is not limited to such an example. For example, the case in which the functions described above are distributed over a plurality of information processing devices is also encompassed within the technical scope of the present disclosure.

In addition, steps described in the flowchart in the specification are, of course, steps carried out in a time-series manner in accordance with the described orders but are not necessarily processed in time series and include the processing steps carried out in parallel or individually. In addition, it is needless to say that the order of carrying out the steps in time series may be properly changed in some cases.

Additionally, the present technology may also be configured as below.

(1) An apparatus including:
an image processor configured to receive a video,
superimpose an object on the video at a distance from a reference point, and
modify a location of the object based on a distance between the object and the reference point in a later frame.

(2) The apparatus according to (1), wherein the image processor modifies a location of the object at a rate based on the distance between the object and the reference point in the later frame.

(3) The apparatus according to (1), wherein the image processor modifies a location of the object at an update rate based on the distance between the object and the reference point in the later frame such that the update rate is increased as the distance between the object and the reference point in the later frame decreases.

(4) The apparatus according to (1) to (3), wherein the image processor measures a noise amount in the distance between the object and the reference point in the later frame and determines the location based on the noise amount and the distance between the object and the reference point in the later frame.

(5) The apparatus according to (4), wherein the image processor changes the location based on the noise amount for a first distance between the object and the reference point in the later frame more than a second distance between the object and the reference point in the later frame, where the first distance is greater than the second distance.

(6) The apparatus according to (4), wherein the image processor determines the location based on the noise amount and the distance between the object and the reference point in the later frame such that only a component of the distance between the object and the reference point including noise is modified by the image processor.

(7) The apparatus according to (4), wherein the image processor determines the location based on the noise amount and the distance between the object and the reference point in the later frame such that only a rotational component of the object is modified by the image processor.

(8) The apparatus according to (1) to (7), wherein the image processor determines a location of a real object in the video and uses the location of the real object as the reference point.

(9) The apparatus according to (1) to (8), further comprising: a camera configured to create the video.

(10) The apparatus according to (1) to (9), further comprising: a display configured to display the video with the object superimposed thereon.

(11) The apparatus according to (1), wherein the image processor generates a visual effect based on the distance between the object and the reference point in the later frame.

(12) The apparatus according to (11), wherein the image processor generates the visual effect such that a blurring effect representing blurring of the object due to motion of the object is generated.

(13) The apparatus according to (11), wherein the image processor generates the visual effect by cascading after images of the object.

(14) The apparatus according to (13), wherein the image processor generates cascades a larger number of after images of the object the greater the distance between the object and the reference point in the later frame.

(15) The apparatus according to (1) to (14), wherein the image processor superimposes a plurality of objects on the video at different distances from the reference point, and modifies a location of each object based on a distance between each object and the reference point in the later frame.

(16) The apparatus according to (3), wherein the image processor generates a visual effect based on the distance between the object and the reference point in the later frame.

(17) The apparatus according to (16), wherein the image processor generates the visual effect such that a blurring effect representing blurring of the object due to motion of the object is generated.

(18) The apparatus according to (17), wherein the image processor generates the visual effect by cascading after images of the object.

(19) The apparatus according to (1) to (18), wherein the image processor tracks the location of the object and the reference point from an earlier frame to the later frame.

(20) The apparatus according to (1) to (19), further comprising:
an sensor configured to generate the video and to send the video to the image processor; and
a display configured to display the video with the object superimposed thereon, the display being on an opposite surface of the apparatus from the sensor.

(21) The apparatus according to (1) to (20), wherein the object is a marker.

(22) A method including:
receiving a video;
superimposing an object on the video at a distance from a reference point; and
modifying a location of the object based on a distance between the object and the reference point in a later frame.

(23) A non-transitory computer readable medium encoded with a program that, when loaded on a processor, causes the processor to perform a method including:
receiving a video;
superimposing an object on the video at a distance from a reference point; and
modifying a location of the object based on a distance between the object and the reference point in a later frame.

REFERENCE SIGNS LIST

100 Information processing device
102 Imaging unit
104 Sensor unit
106 Input unit
108 Storage unit
110 Display unit
112 Communication unit
114 Control unit
120 Image acquisition unit
125 Image recognition unit
130 Object data acquisition unit
135 Posture position calculation unit
140 Recognition noise estimation unit
145 Correction unit
147 Visual effect information generation unit
150 Display control unit

The invention claimed is:

1. An apparatus comprising:
an image processor configured to:
receive a video;
superimpose an object on the video at a distance from a reference point; and
modify a location of the object based on a distance between the object and the reference point in a later frame,
wherein the location of the object is modified at an update rate based on the distance between the object and the reference point in the later frame such that the update rate is increased as the distance between the object and the reference point in the later frame decreases.

2. The apparatus according to claim 1, wherein the image processor is configured to modify the location of the object at a rate based on the distance between the object and the reference point in the later frame.

3. The apparatus according to claim 1, wherein the image processor generates a visual effect based on the distance between the object and the reference point in the later frame.

4. The apparatus according to claim 3, wherein the image processor generates the visual effect such that a blurring effect representing blurring of the object due to motion of the object is generated.

5. The apparatus according to claim 4, wherein the image processor generates the visual effect by cascading after images of the object.

6. The apparatus according to claim 1, wherein the image processor is configured to:
  measure a noise amount in the distance between the object and the reference point in the later frame; and
  determine the location based on the noise amount and the distance between the object and the reference point in the later frame.

7. The apparatus according to claim 1, wherein the image processor is configured to track the location of the object and the reference point from an earlier frame to the later frame.

8. The apparatus according to claim 1, further comprising:
  a sensor configured to generate the video and to send the video to the image processor; and
  a display configured to display the video with the object superimposed thereon, the display being on an opposite surface of the apparatus from the sensor.

9. The apparatus according to claim 1, wherein the object is a marker.

10. The apparatus according to claim 1, wherein the image processor is configured to determine a location of a real object in the video and use the location of the real object as the reference point.

11. The apparatus according to claim 1, further comprising:
  a camera configured to create the video.

12. The apparatus according to claim 1, further comprising:
  a display configured to display the video with the object superimposed thereon.

13. The apparatus according to claim 1, wherein the image processor generates a visual effect based on the distance between the object and the reference point in the later frame.

14. The apparatus according to claim 13, wherein the image processor generates the visual effect such that a blurring effect representing blurring of the object due to motion of the object is generated.

15. The apparatus according to claim 13, wherein the image processor generates the visual effect by cascading after images of the object.

16. The apparatus according to claim 15, wherein the image processor generates cascades a larger number of after images of the object the greater the distance between the object and the reference point in the later frame.

17. The apparatus according to claim 1, wherein the image processor superimposes a plurality of objects on the video at different distances from the reference point, and modifies a location of each object based on a distance between each object and the reference point in the later frame.

18. A method comprising:
  receiving a video;
  superimposing an object on the video at a distance from a reference point; and
  modifying a location of the object based on a distance between the object and the reference point in a later frame,
  wherein the location of the object is modified at an update rate based on the distance between the object and the reference point in the later frame such that the update rate is increased as the distance between the object and the reference point in the later frame decreases.

19. A non-transitory computer readable medium having stored thereon, a set of computer-executable instructions for causing an apparatus to perform operations comprising:
  receiving a video;
  superimposing an object on the video at a distance from a reference point; and
  modifying a location of the object based on a distance between the object and the reference point in a later frame,
  wherein the location of the object is modified at an update rate based on the distance between the object and the reference point in the later frame such that the update rate is increased as the distance between the object and the reference point in the later frame decreases.

* * * * *